United States Patent
Charlton et al.

(10) Patent No.: US 9,525,866 B1
(45) Date of Patent: Dec. 20, 2016

(54) BUILDING A DIGITAL CAMERA FINGERPRINT FROM CROPPED OR CORRUPTED IMAGES

(71) Applicant: The United States of America as represented by the Director, National Security Agency, Washington, DC (US)

(72) Inventors: Sarah T. Charlton, Frederick, MD (US); Carla D. Martin

(73) Assignee: The United States of America as represented by the Director, National Security Agency, Washington, DC (US)

( * ) Notice: Subject to any disclaimer, the term of this patent is extended or adjusted under 35 U.S.C. 154(b) by 0 days.

(21) Appl. No.: 15/131,192

(22) Filed: Apr. 18, 2016

(51) Int. Cl.
*G06K 9/00* (2006.01)
*H04N 17/00* (2006.01)
*G06T 5/00* (2006.01)

(52) U.S. Cl.
CPC .......... *H04N 17/004* (2013.01); *G06T 5/002* (2013.01)

(58) Field of Classification Search
CPC ............... G06K 2009/00583; G06K 9/00577; G06K 9/46
USPC ....... 348/181, 189, 180, 61, 211.9; 382/181, 382/209, 278, 124, 123, 100
See application file for complete search history.

(56) References Cited

U.S. PATENT DOCUMENTS

| | | | | |
|---|---|---|---|---|
| 8,374,386 | B2* | 2/2013 | Bayram | G06F 17/30799 382/100 |
| 2015/0169936 | A1* | 6/2015 | Ivanov | G06K 9/00013 382/124 |

OTHER PUBLICATIONS

Lukas, J. et al.; Digital Camera Identification from Sensor Pattern Noise; IEEE Transactions on Information Security and Forensics, 1(2), pp. 205-214, Jun. 2006; available at the following link: http://www.ws.binghamton.edu/fridrich/Research/double.pdf.

(Continued)

*Primary Examiner* — Paulos M Natnael
*Assistant Examiner* — Jean W Desir

(57) ABSTRACT

A method of identifying a digital camera is disclosed. First and second digital images generated by the camera have dimensions that are not equal. The method includes calculating noise residuals and normalized cross-correlations (NCCs) between the noise residuals corresponding to candidate translations. The method further includes calculating a noise floor and identifying first and second peak values corresponding to translations. The method further includes calculating a peak ratio, determining that the peak ratio exceeds an alignment threshold and calculating a digital camera fingerprint for the digital camera based on the noise residuals and the first translation. The method further includes receiving a digital image, calculating a noise residual of the digital image, and determining that the image was generated by the digital camera based on the noise residual and the fingerprint and generating a record associating the image with the camera.

20 Claims, 7 Drawing Sheets

(56) References Cited

OTHER PUBLICATIONS

Goljan, M. et al.; Identifying Common Source Digital Camera from Image Pairs; Proc. ICIP 2007, Sep. 14-19, 2007, San Antonio, Texas; available at the following link: http://www.ws.binghamton.edu/fridrich/Research/Image_pairs_05.pdf.

Goljan, M. et al.; Camera Identification from Cropped and Scaled Images; Proc. SPIE, Electronic Imaging, Forensics, Security, Steganography, and Watermarking of Multimedia Contents X, San Jose, CA; Jan. 26-31, 2008, pp. OE-1-OE-13; available at the following link: http://www.ws.binghamton.edu/fridrich/Research/Crop_scale.pdf.

Goljan, M. et al.; Large Scale Test of Sensor Fingerprint Camera Identification; Proc. SPIE, Electronic Imaging, Media Forensics and Security XI, San Jose, CA, Jan. 18-22, 2009, pp. 0I 1-0I 12; available at the following link: http://www.ws.binghamton.edu/fridrich/Research/EI7254-18.pdf.

* cited by examiner

BUILDING A DIGITAL CAMERA FINGERPRINT FROM CROPPED OR CORRUPTED IMAGES

FIELD OF INVENTION

The present invention relates, in general, to image processing, and in particular, to digital camera fingerprinting.

BACKGROUND OF THE INVENTION

Camera fingerprinting is a process for linking a particular image to the exact camera from which it was taken. This process, which is used in, for example, forensics applications, has been compared to gun identification from bullet scratches. In classical film photography, there are methods for camera identification used in forensic science. Some of these methods use camera imperfections, such as scratches on the negative caused by the film transport mechanism.

It also is possible to perform camera fingerprinting using a noise pattern for a sensor in a digital camera. Digital cameras capture light with either a charge-coupled device (CCD) or complementary metal-oxide semiconductor (CMOS). Both are made of grids of light detectors, i.e., pixels. Since the camera sensor is made of silicon, natural variations in the size and consistency of the pixels occur as part of the manufacturing process. These slight imperfections on the image sensor impart a noise pattern on the image that can be extracted and analyzed. The noise pattern is called the photo response non-uniformity (PRNU). Camera fingerprints have been determined by combining the PRNU from multiple images captured by the same digital camera.

SUMMARY

One embodiment of the present invention is a computer-implemented method of using a digital camera fingerprint to identify a digital camera that generated a test digital image. The method includes receiving a first digital image generated by the digital camera and having first dimensions and receiving a second digital image generated by the digital camera and having second dimensions. The first dimensions and the second dimensions are not equal. The method also includes calculating a first noise residual of the first image, calculating a second noise residual of the second image, and calculating a plurality of normalized cross-correlations (NCCs) between the first noise residual and the second noise residual corresponding to a plurality of candidate translations. The method also includes calculating a noise floor based on the plurality of NCCs, identifying a first peak value based on the plurality of NCCs and the noise floor and corresponding to a first translation, and identifying a second peak value based on the plurality of NCCs and the noise floor and corresponding to a second translation. The method also includes calculating a peak ratio based on the first peak value and the second peak value, determining that the peak ratio exceeds an alignment threshold, and calculating a digital camera fingerprint for the digital camera based on the first noise residual, the second noise residual, and the first translation. The method further includes receiving a third digital image generated by the digital camera, calculating a third noise residual of the third image, determining a third translation having an associated peak ratio exceeding the alignment threshold, and calculating an updated digital camera fingerprint for the digital camera based on the digital camera fingerprint, the third noise residual, and the third translation. The method also includes receiving the test digital image, calculating a test noise residual of the test digital image, and determining that the test digital image was generated by the digital camera based on the test noise residual and the updated digital camera fingerprint. The method also includes generating a digital record associating the test digital image with the digital camera.

In a related embodiment, determining that the test digital image was generated by the digital camera includes calculating a test image peak ratio and determining that the test image peak ratio exceeds a test image peak ratio threshold. In another related embodiment, determining that the test digital image was generated by the digital camera includes calculating a peak to correlation energy (PCE) score and determining that the PCE score exceeds a PCE score threshold. In another related embodiment, determining that the test digital image was generated by the digital camera includes calculating an NCC score and determining that the NCC score exceeds an NCC score threshold.

In a further related embodiment, the first digital image and the second digital image are grayscale images and generating the first and second digital images includes processing a first color image and a second color image to generate the first digital image and the second digital image. In another related embodiment, the first digital image and the second digital image are each images having a single color channel and generating the first and second digital images includes processing a first color image having at least three color channels and a second color image having at least three color channels to generate the first digital image and the second digital image. Calculating the digital camera fingerprint also includes combining digital camera fingerprints calculated based on the color channels for the first and second color images.

In a further related embodiment, the first digital image has a landscape layout and the second digital image has a portrait layout.

In a further related embodiment, the first digital image, the second digital image, and the third digital image are selected from a plurality of digital images in an order based on the relative sizes of the images in the plurality of digital images.

In another related embodiment, calculating a noise residual comprises applying a de-noising filter to an input image to generate a de-noised image and subtracting the de-noised image from the input image. Alternatively, or in addition, applying the de-noising filter comprises applying a Wiener filter. Alternatively, or in addition, applying the de-noising filter comprises performing a multiresolution analysis wavelet decomposition. Alternatively, or in addition, the wavelet decomposition is a level 4 decomposition.

In another related embodiment, each of the candidate translations comprises a vertical displacement, a horizontal displacement, and a rotation. In another related embodiment, the alignment threshold is no greater than 0.7.

Another embodiment is a computer-readable medium having computer processor-executable instructions stored thereon. Execution of the instructions by a computer processor causes the computer processor to perform a method of identifying a digital camera that generated a test digital image. The method includes receiving a first digital image generated by the digital camera and having first dimensions and receiving a second digital image generated by the digital camera and having second dimensions. The first dimensions and the second dimensions are not equal. The method also includes calculating a first noise residual of the first image, calculating a second noise residual of the second image, and calculating a plurality of normalized cross-correlations (NCCs) between the first noise residual and the second noise residual corresponding to a plurality of candidate translations. The method also includes calculating a noise floor based on the plurality of NCCs, identifying a first peak value based on the plurality of NCCs and the noise floor and corresponding to a first translation, and identifying a second peak value based on the plurality of NCCs and the noise floor and corresponding to a second translation. The method also includes calculating a peak ratio based on the first peak value and the second peak value, determining that the peak ratio exceeds an alignment threshold, and calculating a digital camera fingerprint for the digital camera based on the first noise residual, the second noise residual, and the first translation. The method further includes receiving a third digital image generated by the digital camera, calculating a third noise residual of the third image, determining a third translation having an associated peak ratio exceeding the alignment threshold, and calculating an updated digital camera fingerprint for the digital camera based on the digital camera fingerprint, the third noise residual, and the third translation. The method also includes receiving the test digital image, calculating a test noise residual of the test digital image, and determining that the test digital image was generated by the digital camera based on the test noise residual and the updated digital camera fingerprint. The method also includes generating a digital record associating the test digital image with the digital camera.

DETAILED DESCRIPTION

A pixel image output by a digital camera may be represented as I. All such images will contain a certain amount of noise from a variety of sources, such as shot noise, read-out noise, quantization distortion, and dark current. One type of noise that is of particular interest is photo response non-uniformity (PRNU). The total noise of an image may be modeled as $I=I_{true}+W$, where $I_{true}$ represents the light intensity of the image without any added noise or imperfections, and W accounts for all types of noise. The noise W, in turn, can be modeled as $W=I_{true}*K+X$, where K represents the distortion of I due to PRNU and X accounts for all other noise in the image other than what can be ascribed to PRNU. In determining digital camera fingerprints, it is generally sufficient to assume X to be Gaussian white noise with mean zero and fixed variance, where X is independent of $I_{true}*K$. A maximum likelihood estimator for K over N images from a single camera can be calculated as $$\hat{K} = \frac{\sum_{k=1}^{N} W_k I_k}{\sum_{k=1}^{N} I_k^2} \quad \text{(EQN. 1)}$$

Figure 1:
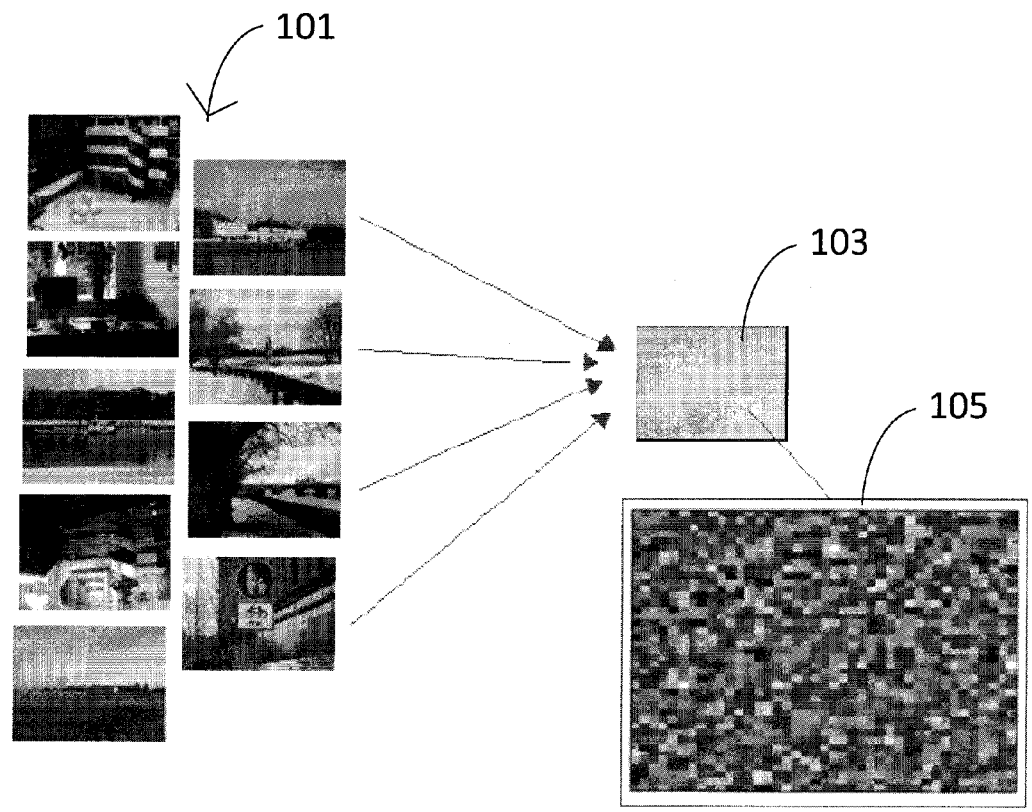
FIG. 1 is a diagram illustrating a digital camera fingerprint.

The conceptual basis of this equation can be seen with reference to FIG. 1, which is a diagram illustrating a digital camera fingerprint. A collection of digital images 101 which are known to have been generated by the same digital camera are processed to create a single characteristic noise pattern 103 (enlarged to show detail at element 105), which is referred to as the fingerprint of the digital camera that generated the images 101.

The estimation of K in EQN. 1 may in some cases be calculated separately for each color channel of the images being analyzed (e.g., red, green, and blue). In some cases, the complete images containing all color channels may instead be treated as grayscale image data and processed accordingly to calculate a digital camera fingerprint representing the unique K of the digital camera. In other cases, it may suffice to consider only a single color channel, and the other color channels may be disregarded in calculating the fingerprint.

Figure 2:
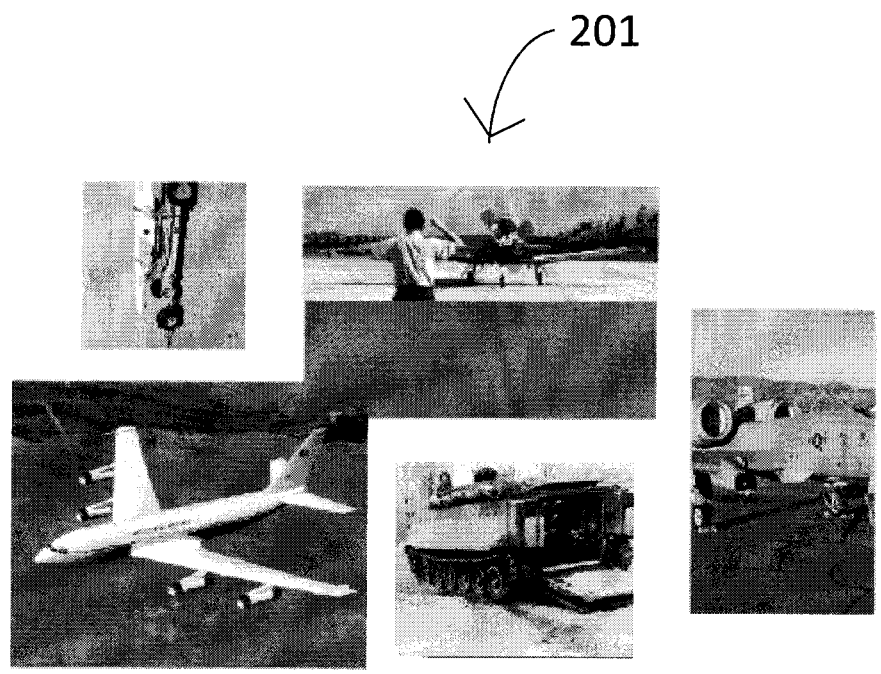
FIG. 2 is a diagram illustrating a collection of digital images having different sizes.

In EQN. 1 above for the maximum likelihood estimator of K, it is assumed that each of the N images used has the same size and orientation as all of the other images. Performing the required matrix calculations entails element-wise combinations which would not be properly defined for unequally-sized images and which would not be sensible for images of differing orientations (i.e., rotated relative to one another). In some cases, however, the images available for calculating a camera fingerprint may not meet these strict requirements. For example, the images may include cropped images or corrupted images which are only partially readable. With reference to FIG. 2, a collection of such images 201 can be seen, including corrupted, rotated, and cropped images.

A cropped image is a subset of an original image that has had parts removed. A camera or digital editing software can crop an image. A corrupted image may be treated similarly to a cropped image for the purposes of calculating a digital camera fingerprint because only a portion of the image file is readable. In either event, the modified image being processed is smaller in size than the original. This presents the problem of determining how the different images should be aligned with one another when calculating the digital camera fingerprint. Previous approaches to digital camera fingerprinting have used sets of images known to be of the same dimensions to generate a digital camera fingerprint which can then be used to identify whether an unknown image was taken by the same camera. For example, as shown in FIG. 1, a set of digital images 101 may be known to have originated from a single camera. Those images may then be used to generate a digital camera fingerprint 103. Element 105 shows the digital camera fingerprint 103 enlarged to illustrate more clearly how an exemplary fingerprint might appear, if it were converted into image data. The inventors have appreciated that a set of images including cropped images, corrupted images, and other images of dissimilar size that are known to come from the same camera, may also be used in calculating a digital camera fingerprint according to methods that will be discussed below.

As shown in FIG. 2, a set of images 201 may include images in portrait or landscape alignment, images that have been rotated, images that have been cropped, and images that are corrupted such that only a portion of the allotted image frame can be decoded. For such images, noise residuals may be calculated similarly to uncorrupted, standard-sized images. However, building a fingerprint is complicated by several factors. When one image in a pair of images includes image data captured by a particular portion of the camera sensor, and the other image in the image pair does not include any image data captured by that portion of the camera sensor, there is no matching data between images corresponding to that portion of the camera sensor. For images that are not full-sized, it must be determined what portion of the camera sensor is represented in the image in question, because combining noise residuals that are not properly aligned will destroy the distinctive noise pattern that is being recovered rather than enhance it. In some cases, pairs of images may respectively correspond to mutually exclusive sub-sections of the camera sensor, such that there may be no information that can be used to provide the required alignment.

Figure 3:
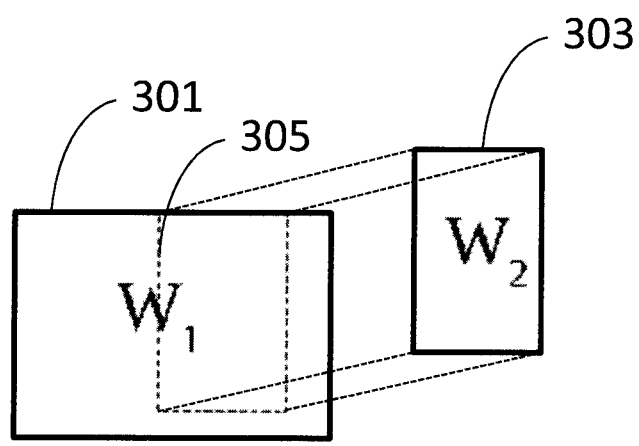
FIGS. 3-5 are diagrams illustrating spatial relationships between pairs of digital images.

While certain pairs of images in the set of images 201 may share no overlapping areas, building a digital fingerprint according to the presently disclosed methods is possible because at least some pairs of images do contain overlapping regions. An ideal case of this is shown in FIG. 3. A pair of images have a first associated noise residual $W_1$ 301 and a second associated noise residual $W_2$ 303, respectively. The portion of the camera sensor represented by the first noise residual 301 completely contains the portion of the camera sensor represented by the second noise residual 303 as a proper subset. Accordingly, all of the information contained in the second noise residual 303 can be compared to the corresponding information in the first noise residual 301, thereby maximizing the probability that the correct alignment 305 can be recovered successfully.

Figure 4:
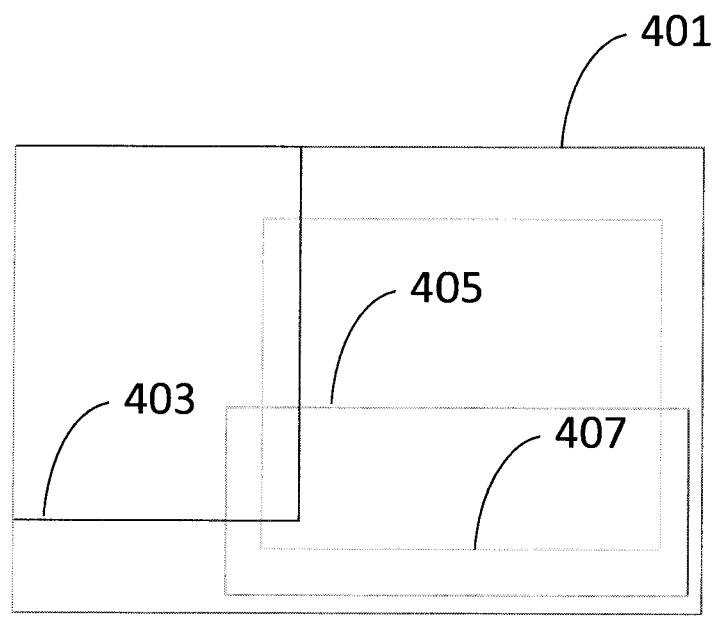

In many cases, a set of images may include at least one full-sized, uncropped image, such that the situation illustrated in FIG. 3 can be achieved in at least one pairing for each image in the set. FIG. 4 shows an example set of four images illustrating this principle. A first image 401 is full-sized, and therefore all other images will overlap completely with this image 401. There also are three other images 403, 405, 407, each of which is cropped to different dimensions in a different area. Each of the smaller images overlaps at least in part with both of the other two smaller images in this particular case.

Figure 5:
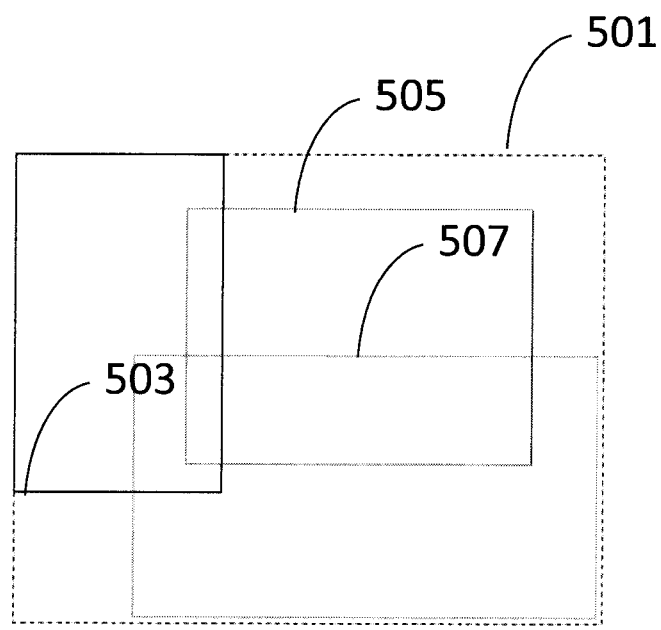

A more complicated situation arises when no single image in the set of images contains the full area of the camera sensor, or even a sufficiently large area to contain each of the other images in the set. FIG. 5 shows an example set of three images illustrating this principle. The full area of the camera sensor corresponds to rectangle 501, but no single image has that full extent. In fact, for a small portion of the lower left and upper right of rectangle 501 this set of images does not have any data at all. The images 503, 505, 507 each are cropped to different dimensions in a different area, and here again each of the images overlaps at least in part with both of the other two images in this particular case.

While image sets have been shown in FIGS. 1-5 for illustrative purposes, in practice, the image sets that are used are significantly larger. Some prior art approaches to generating digital camera fingerprints have required as many as several hundred training images to obtain reliable results, and at least several dozen images tend to be required by prior art methods. The degree of mutual overlap of cropped images throughout the image set will affect the data requirements significantly, however. The less mutual overlap there is, the more images will be required to obtain statistically meaningful results. Using more images will tend to increase the statistical probability of a correct identification, although processing time may be increased by a meaningful amount, depending on the number of images used.

Figure 6:
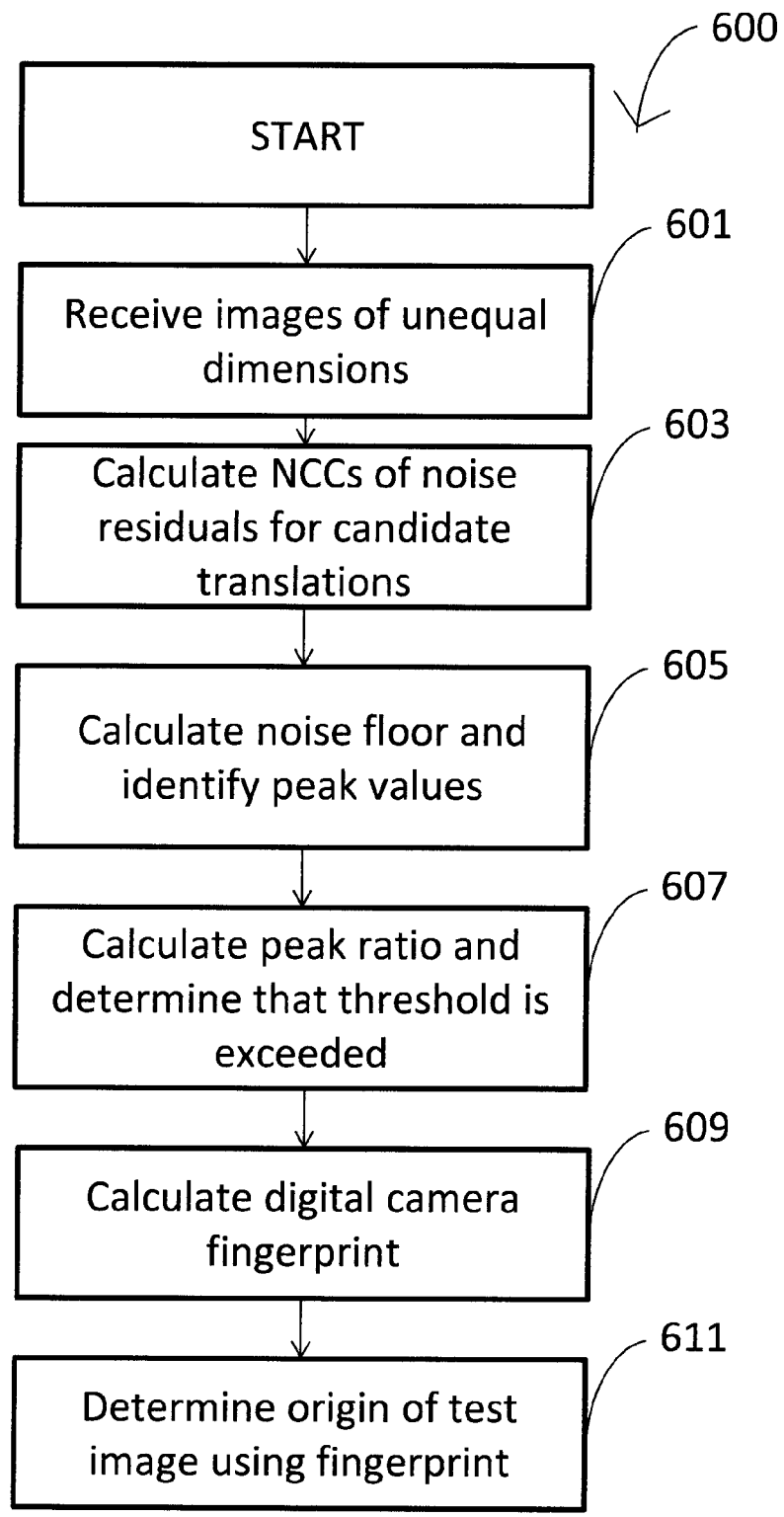
FIG. 6 is a flow chart describing a process for building a digital camera fingerprint in accordance with an embodiment of the present invention.

A process in accordance with an embodiment of the present invention is now described with reference to FIG. 6, which is a flow chart describing a process for building a digital camera fingerprint. The process begins at block 601, where input images are received. The images do not all have the same dimensions. This may be because one or more of the input images is a cropped image. This also may be because one or more of the input images is a corrupted image. For corrupted images, the "dimensions" of an image mean here the dimensions of the portion of the image that can be rendered properly despite the partial corruption of some of the image. If an image is corrupted such that no portion of the image can be recovered, that image is not used at all. An image also may have been rotated through some multiple of 90 degrees.

The process continues at block 603, where normalized cross-correlations (NCCs) are calculated across a set of noise residuals over a set of candidate translations. The set of noise residuals is derived from the set of input images that was received at block 601. Each input image is processed to extract noise from the image. This processing may include application of a denoising filter, such as a multiresolutional analysis (MRA) wavelet decomposition. In some embodiments, a level 4 MRA wavelet decomposition may be used, although other embodiments may be chosen according to the requirements of the particular application, the desired balance of speed and reliability, etc. Other embodiments may employ a Wiener filter. The noise that is extracted from an image constitutes the "noise residual" of that image, which can itself be treated as a signal. Each noise residual provides a noisy approximation of the constant PRNU noise pattern that the camera in question inherently generates in every image the camera takes.

The plurality of NCCs between a pair of noise residuals are used to determine how those two noise residuals should be aligned relative to one another. In order to compute the NCCs for noise residuals that do not have the same dimensions, matrices representing the noise residuals are padded with zeros, giving a pair of matrices both now having the same dimensions, which can be up to the maximum allowable dimensions for images from the camera in question. Cross-correlation values for the pair of matrices are calculated over possible vertical and horizontal translations, ranging from zero displacement to the maximum displacement possible within boundaries corresponding to the sensor size. In some embodiments, this may be done multiple times for rotated and/or flipped versions of each noise residual. A high cross-correlation value, i.e., a value exceeding a designated threshold, suggests that the candidate translation that resulted in that cross-correlation value gives the proper alignment between the two noise residuals. The NCCs may be calculated in the form of a matrix having one matrix element corresponding to one NCC value for each possible coordinate shift. An efficient calculation method may be used, such as a fast Fourier transform.

For a pair of noise residuals (including zero-padding) $W_1$, $W_2$, we can define the NCC between them in terms of the possible coordinate shifts $(s_x, s_y)$ of $W_2$ against $W_1$ as follows:

$$\rho(s_x, s_y; W_1, W_2) = \frac{\sum_{k=1}^{m}\sum_{l=1}^{n}(W_1[k,l] - \overline{W}_1)(W_2[k+s_x, l+s_y] - \overline{W}_2)}{\|W_1 - \overline{W}_1\|\|W_2 - \overline{W}_2\|} \quad \text{(EQN. 2)}$$

In order to avoid false alignments, however, it is important to consider additional information. The process continues at block 605, where a noise floor and peak values are identified. In some cases, such as for very homogenous data, several candidate translations that are close to each other may have similar cross-correlation values. While one of these candidate translations may be correct, it is difficult to say with any certainty which one it is. It also may be that none of them are correct. If, however, a single candidate translation corresponds to a very high cross-correlation value, while other candidate translations in the local vicinity do not, then that marked difference indicates that it is significantly more likely that the candidate translation is correct.

Determining the significance of a particular cross-correlation value and choosing a proper confidence threshold also depends on the overall characteristics of the data being interpreted. We can safely assume that the cross-correlation value corresponding to the correct translation is one of the highest observed values, although not always the very highest. Thus, if we remove the top several peak values from the set of cross-correlation values calculated, the remaining values all represent translations which are almost certainly incorrect. In some embodiments the top 4 or 5 values may be used, but more or fewer values also may be used. Cross-correlation values that are statistically similar to the remaining NCC values after removing the top values cannot be distinguished from random variations under the assumption that these translations are incorrect. This reduced set of values can thus be used to model a statistical noise floor.

Those highest values that were removed can then be compared to the noise floor to determine whether or not they are significant peak values. The process continues at block 607, where a peak ratio is calculated, which is compared to a threshold value to determine whether the threshold has been met or exceeded. In order to rely on the calculated cross-correlations to identify, confidently, the correct translation between a pair of noise residuals, the translation having the highest associated cross-correlation value is taken as the putative correct translation. In the absence of a mechanism for ruling out higher values in a local vicinity, this is the only translation we can hope to verify. To verify whether this local maximum is a correct translation, a peak ratio can be calculated between the highest cross-correlation value and the second highest cross-correlation value. The inventors have observed that a threshold value of 70% (i.e., the second-highest value is at most 70% of the highest value) may be useful for maximizing the likelihood of finding a translation and that translation being correct. Other threshold values may be chosen according to the desired application, however. A higher threshold value will increase the likelihood of finding a translation, whereas a lower threshold value will increase the likelihood that any translation that is found is correct and is not a false alignment. In the event the peak ratio does not satisfy the threshold value, then the presently considered pair of images cannot be aligned at this time, and the fingerprint will need to be built based on other pairs of images, at least initially. If multiple sets of aligned images are recovered, it may later be possible that one or more of these unaligned images can be aligned with a different image, and that they are subsumed into the fingerprint that may be recovered by combining these disparate sets.

The process continues at block 609, where a digital camera fingerprint is calculated. A set of noise residuals that have been padded with zeros can be combined to generate a fingerprint according to EQN. 1. In principle, this can be done with any number of noise residuals, even only one or two. In practice, however, the random variation present in each of the noise residuals is sufficiently high that a significant number of noise residuals must be combined to develop useful statistical confidence in the results of camera identification using the fingerprint. This process may be performed repeatedly, evaluating, aligning, and adding more and more noise residuals to the fingerprint until the desired level of statistical confidence is reached. A useful concept in this regard is the "fingerprint mass," which refers to how much data has been included into the fingerprint from each noise residual. For example, if four separate full-frame images are processed to extract noise residuals, a fingerprint based on combining these four noise residuals could be said to have a mass of 4. Alternatively, the mass may be defined as the number of images successfully added to a fingerprint, irrespective of the amount of data provided by each individual image.

Figure 7:
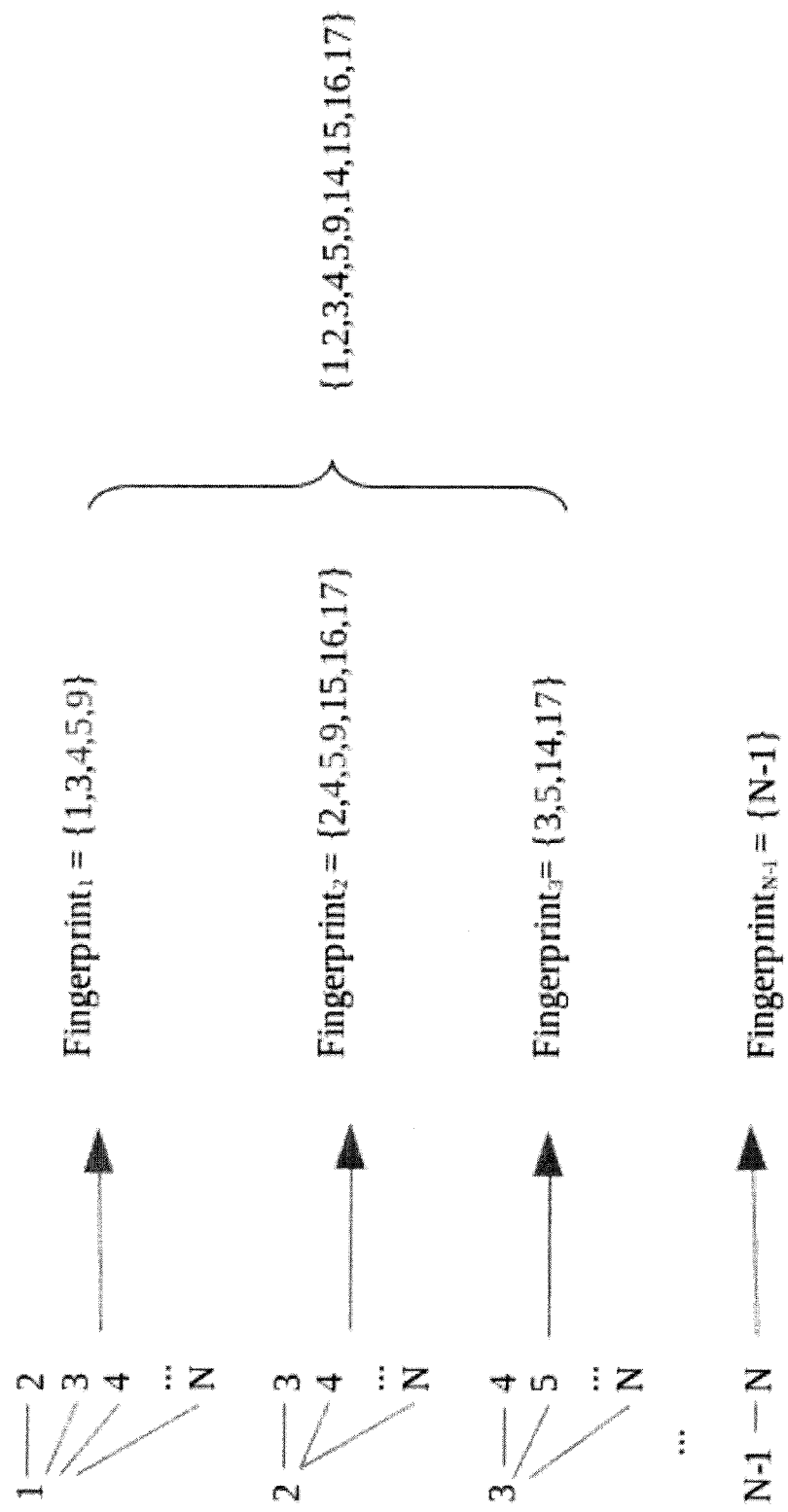
FIG. 7 is a diagram illustrating combination of image fingerprints to generate new fingerprints.

Combination of fingerprints as just described may be further understood with reference to FIG. 7, which is a diagram illustrating combination of image fingerprints to generate new fingerprints. Fingerprints may be sorted by descending fingerprint mass, after which it may be determined which fingerprint masses contain overlapping images. For those sets that intersect, they may be combined by taking successive unions until the desired mass is achieved, or until no additional fingerprints are available for combination. In the example shown in FIG. 7, there are N–1 possible fingerprints computed directly from the images being analyzed. The image numbers in each computed fingerprint are shown, and the number of images in that set is the mass of that fingerprint. Starting with the fingerprint having the largest mass, the next largest fingerprint(s) is examined to determine whether any other sets intersect. The union of those sets is taken and the fingerprints are combined into one with a larger mass.

The process continues at block 611, where the fingerprint is used to determine the origin of a test image. For a test image of unknown origin, the digital camera fingerprint may be used to determine whether or not the test image was generated by the particular digital camera in question, according to various techniques known in the art. As a result of the process just described, this identification was made possible using an input data set including images of disparate sizes (e.g., cropped images) to generate the fingerprint.

Depending on the embodiment, certain acts, events, or functions of any of the methods described herein can be performed in a different sequence, can be added, merged, or left out altogether. Not all described acts or events are necessarily required for the practice of any claimed method. Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends on the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The steps of a method or process described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, a DVD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

While the above description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be embodied within a form that may not provide all of the features and benefits set forth herein, as some features can be used or practiced separately from others. The scope of the invention is indicated by the appended claims rather than the foregoing description. All changes which come within the meaning and range of equivalency of the claims are to be embraced within their scope.

We claim:

1. A computer-implemented method of using a digital camera fingerprint to identify a digital camera that generated a test digital image, the method comprising:
   receiving a first digital image generated by the digital camera and having first dimensions;
   receiving a second digital image generated by the digital camera and having second dimensions, wherein the first dimensions and the second dimensions are not equal;
   calculating a first noise residual of the first image;
   calculating a second noise residual of the second image;
   calculating a plurality of normalized cross-correlations (NCCs) between the first noise residual and the second noise residual corresponding to a plurality of candidate translations;
   calculating a noise floor based on the plurality of NCCs;
   identifying a first peak value based on the plurality of NCCs and the noise floor and corresponding to a first translation;
   identifying a second peak value based on the plurality of NCCs and the noise floor and corresponding to a second translation;
   calculating a peak ratio based on the first peak value and the second peak value;
   determining that the peak ratio exceeds an alignment threshold;
   calculating a digital camera fingerprint for the digital camera based on the first noise residual, the second noise residual, and the first translation;
   receiving a third digital image generated by the digital camera;
   calculating a third noise residual of the third image;
   determining a third translation having an associated peak ratio exceeding the alignment threshold;
   calculating an updated digital camera fingerprint for the digital camera based on the digital camera fingerprint, the third noise residual, and the third translation;
   receiving the test digital image;
   calculating a test noise residual of the test digital image;
   determining that the test digital image was generated by the digital camera based on the test noise residual and the updated digital camera fingerprint; and
   generating a digital record associating the test digital image with the digital camera.

2. A method in accordance with claim 1, wherein determining that the test digital image was generated by the digital camera includes calculating a test image peak ratio and determining that the test image peak ratio exceeds a test image peak ratio threshold.

3. A method in accordance with claim 1, wherein determining that the test digital image was generated by the digital camera includes calculating a peak to correlation energy (PCE) score and determining that the PCE score exceeds a PCE score threshold.

4. A method in accordance with claim 1, wherein determining that the test digital image was generated by the digital camera includes calculating an NCC score and determining that the NCC score exceeds an NCC score threshold.

5. A method in accordance with claim 1, wherein the first digital image and the second digital image are grayscale images and generating the first and second digital images includes processing a first color image and a second color image to generate the first digital image and the second digital image.

6. A method in accordance with claim 1, wherein:
   the first digital image and the second digital image are each images having a single color channel and generating the first and second digital images includes processing a first color image having at least three color channels and a second color image having at least three color channels to generate the first digital image and the second digital image; and
   calculating the digital camera fingerprint includes combining digital camera fingerprints calculated based on the color channels for the first and second color images.

7. A method in accordance with claim 1, wherein the first digital image has a landscape layout and the second digital image has a portrait layout.

8. A method in accordance with claim 1, wherein the first digital image, the second digital image, and the third digital image are selected from a plurality of digital images in an order based on the relative sizes of the images in the plurality of digital images.

9. A method in accordance with claim 1, wherein calculating a noise residual comprises applying a de-noising filter to an input image to generate a de-noised image and subtracting the de-noised image from the input image.

10. A method in accordance with claim 9, wherein applying the de-noising filter comprises applying a Wiener filter.

11. A method in accordance with claim 9, wherein applying the de-noising filter comprises performing a multiresolution analysis wavelet decomposition.

12. A method in accordance with claim 11, wherein the wavelet decomposition is a level 4 decomposition.

13. A method in accordance with claim 1, wherein each of the candidate translations comprises a vertical displacement, a horizontal displacement, and a rotation.

14. A method in accordance with claim 1, wherein the alignment threshold is no greater than 0.7.

15. A non-transitory computer-readable medium having computer processor-executable instructions stored thereon, wherein execution of the instructions by a computer processor causes the computer processor to perform a method of identifying a digital camera that generated a test digital image, the method comprising:
   receiving a first digital image generated by the digital camera and having first dimensions;
   receiving a second digital image generated by the digital camera and having second dimensions, wherein the first dimensions and the second dimensions are not equal;
   calculating a first noise residual of the first image;
   calculating a second noise residual of the second image;
   calculating a plurality of normalized cross-correlations (NCCs) between the first noise residual and the second noise residual corresponding to a plurality of candidate translations;
   calculating a noise floor based on the plurality of NCCs;
   identifying a first peak value based on the plurality of NCCs and the noise floor and corresponding to a first translation;
   identifying a second peak value based on the plurality of NCCs and the noise floor and corresponding to a second translation;
   calculating a peak ratio based on the first peak value and the second peak value;
   determining that the peak ratio exceeds an alignment threshold;
   calculating a digital camera fingerprint for the digital camera based on the first noise residual, the second noise residual, and the first translation;
   receiving a third digital image generated by the digital camera;
   calculating a third noise residual of the third image;
   determining a third translation having an associated peak ratio exceeding the alignment threshold;
   calculating an updated digital camera fingerprint for the digital camera based on the digital camera fingerprint, the third noise residual, and the third translation;
   receiving the test digital image;
   calculating a test noise residual of the test digital image;
   determining that the test digital image was generated by the digital camera based on the test noise residual and the updated digital camera fingerprint; and
   generating a digital record associating the test digital image with the digital camera.

16. A computer-readable medium in accordance with claim 15, wherein the first digital image, the second digital image, and the third digital image are selected from a plurality of digital images in an order based on the relative sizes of the images in the plurality of digital images.

17. A computer-readable medium in accordance with claim 15, wherein the first digital image has a landscape layout and the second digital image has a portrait layout.

18. A computer-readable medium in accordance with claim 15, wherein each of the candidate translations comprises a vertical displacement, a horizontal displacement, and a rotation.

19. A computer-readable medium in accordance with claim 15, wherein determining that the test digital image was generated by the digital camera includes calculating a test peak ratio and determining that the test peak ratio exceeds a test image peak ratio threshold.

20. A computer-readable medium in accordance with claim 15, wherein:
   the first digital image and the second digital image are each images having a single color channel and generating the first and second digital images includes processing a first color image having at least three color channels and a second color image having at least three color channels to generate the first digital image and the second digital image; and
   calculating the digital camera fingerprint includes combining digital camera fingerprints calculated based on the color channels for the first and second color images.

* * * * *